Nov. 11, 1952          R. W. KNIGHT          2,617,570
FOUNDATION FRAME FOR PARADE FLOATS
Filed Aug. 22, 1949          2 SHEETS—SHEET 1
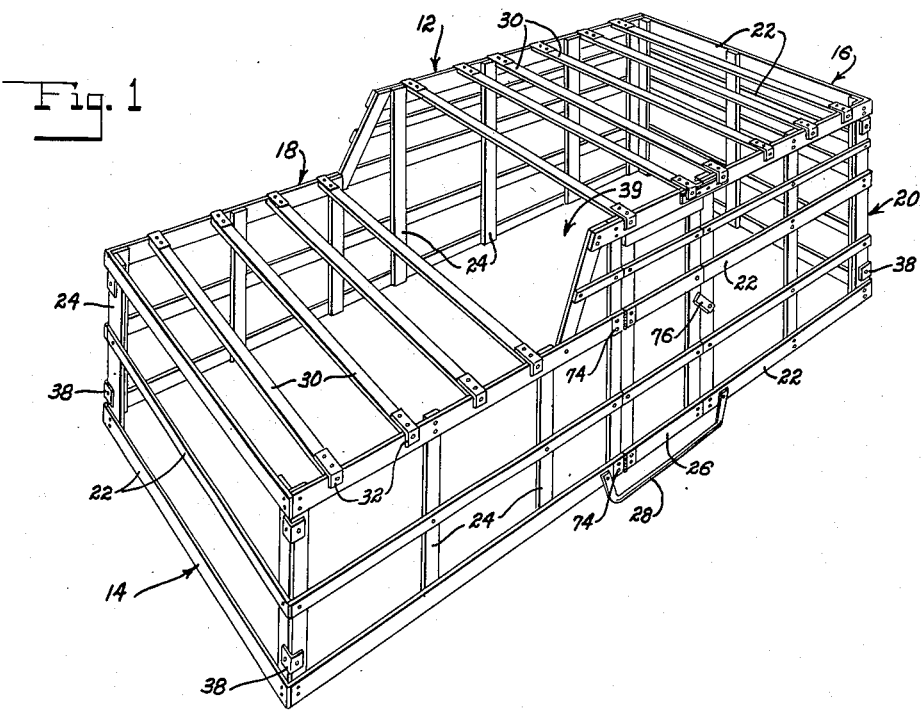
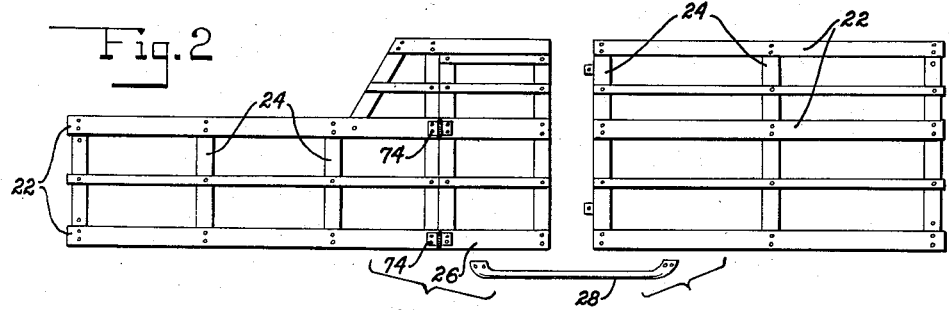
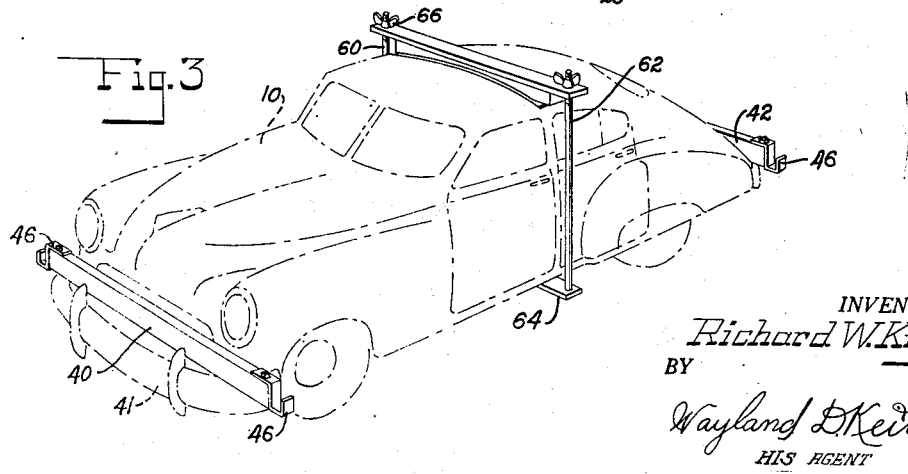
INVENTOR.
Richard W. Knight
BY
Wayland D. Keith
HIS AGENT

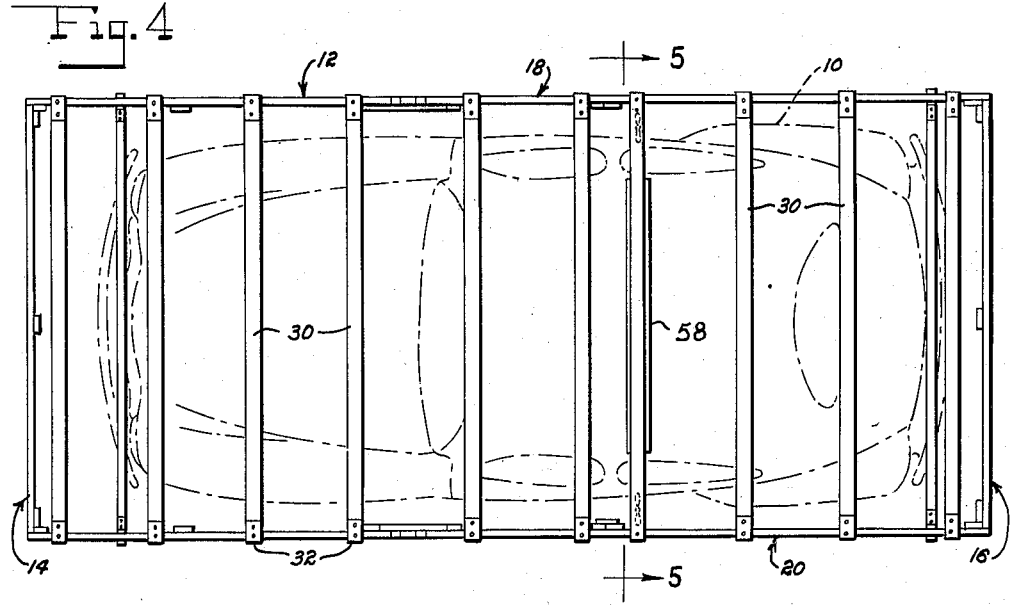
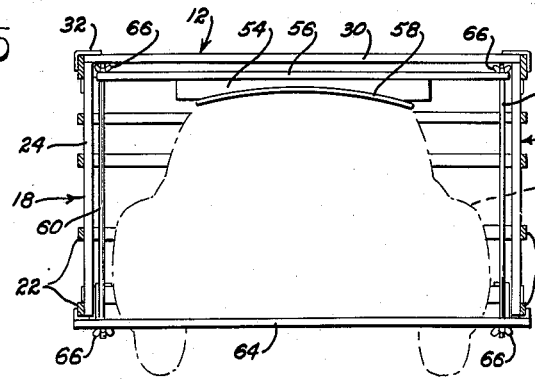
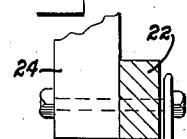
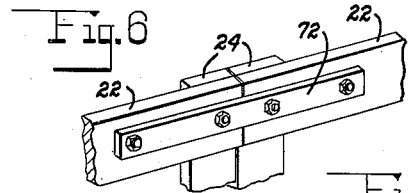
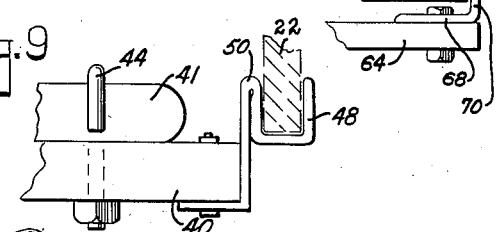
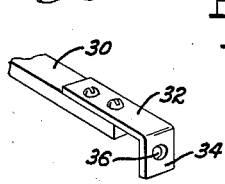
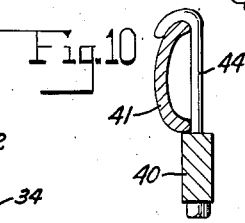

Patented Nov. 11, 1952

2,617,570

UNITED STATES PATENT OFFICE 2,617,570

FOUNDATION FRAME FOR PARADE FLOATS

Richard W. Knight, Wichita Falls, Tex.

Application August 22, 1949, Serial No. 111,605

4 Claims. (Cl. 224—42.03)

This invention relates to foundation frames for parade floats, and more particularly to a frame for application to automobiles or other vehicles in the preparation of decorative floats to be used in parades and for similar occasions.

In the preparation of floats for parades by methods heretofore commonly used difficulty is frequently encountered due to the fact that the vehicles employed are not well adapted for the application of decorative materials. Such floats are also usually unduly expensive because of the length of time consumed in decorating the same, since the vehicle used must be taken out of normal service and cannot be otherwise employed until the parade is over. Moreover, a float prepared in the customary manner is suitable for use on only one occasion, after which it must be completely discarded and a new one constructed for the next use.

By the present invention, a foundation frame is provided which may be assembled and decorated before application to the vehicle, thus making possible the continued use of the vehicle until the time of the parade. Means is provided for supporting the frame on the vehicle, whereby the frame may be quickly applied and removed and is securely held in position while in use.

The present invention has for its principal object the provision of a foundation frame for application to a vehicle to be used as a parade float, which frame can be conveniently decorated and placed on the vehicle with a minimum of labor and expense, and without interference with the normal use of the vehicle for other purposes.

A further object of the invention is to provide a foundation frame to be readily placed on and removed from a vehicle, which frame is capable of adjustment to any of a wide variety of different sized vehicles, and may be employed with many different kinds of decorative materials.

Another object of the invention is to provide means for attaching a foundation frame to a vehicle to be used as a parade float whereby the vehicle is substantially completely covered by the frame, leaving no projecting parts upon which bystanders along the parade route can climb, thus eliminating the danger occasioned by persons stealing a ride on the float.

A further object of the invention is the provision of means to permit ready access to the interior of the vehicle to which the frame has been applied, without disturbing the decoration or inconveniencing the driver of the same.

A still further object of the invention is to provide a foundation float frame which will be securely held in place on the vehicle, is easily removed therefrom, and which is of simple design and rugged construction capable of withstanding the rough usage to which such a structure is likely to be subjected.

The invention will best be understood from the following description constituting a specification of the same, when taken in conjunction with the annexed drawings wherein—

Fig. 1 is a perspective view of the assembled frame;

Fig. 2 is an exploded side elevational view showing the construction of one side of the frame;

Fig. 3 is a perspective view showing the means by which the frame is supported upon the vehicle and how such means are secured to the vehicle, the latter being indicated in dot-dash outline;

Fig. 4 is a top plan view of the frames as installed on a vehicle;

Fig. 5 is a cross sectional view taken along the line 5—5 of Fig. 4, looking in the direction indicated by the arrows;

Fig. 6 is a fragmentary perspective view showing the structural details of two adjoining portions of one side of the frame and the means by which such portions are connected together;

Fig. 7 is a fragmentary perspective view of one of the top transverse frame elements, showing the means by which the same is secured to a longitudinal frame member;

Fig. 8 is a fragmentary view showing the structural details of the means by which the mid-portion of the frame is supported at the bottom from the vehicle;

Fig. 9 is a fragmentary elevational view, looking at one end of the vehicle, showing a modified form of the means for supporting the frame on a vehicle bumper, indicating how such means is attached to the bumper and how it is engaged by the frame; and Fig. 10 is a fragmentary side elevational view of the means for supporting the frame illustrated in Fig. 9.

Referring to the drawings in greater detail, an automobile or other vehicle of a suitable type is indicated generally at 10, upon which the foundation frame indicated generally at 12 is to be supported for the purpose of forming a parade float. The foundation frame is carried by transverse supporting members, which may be secured to the vehicle bumpers, either above or below the same, at the ends of the vehicle. In addition, supporting means for the frame is positioned on the roof of the vehicle intermediate the ends thereof.

The foundation frame comprises front and rear end sections 14 and 16, respectively, and side sections 18 and 19 in one or both of which a gate is provided for ready access to the interior of the vehicle.

The various sections of the frame may be conveniently formed of a plurality of horizontal rails 22 connected by vertical bars 24 at suitably spaced intervals. The side frame sections may be formed in two portions as best seen in Figs. 1 and 2, these portions being spaced apart to provide an opening for a gate 26. The top rails of the portions of the side section are joined across the top of the gate, and below the bottom of the gate these portions are connected by a rod 28 of general U-shape.

Across the top of the frame the side sections are connected by transverse top members 30. The top members 30 are provided at their ends with angle-shaped connectors 32, the downturned portions 34 of which are spaced from the ends of the members to provide recesses for the reception of the top rails of the side sections. A hole 36 is provided in each of the connectors 32 to enable the same to be fastened to the top rail of the side section.

At the corners of the frame connecting angles 38 are provided for securing together the side and end members to form a frame of substantially rectangular shape about the vehicle.

As will best be seen in Figs. 1 and 5, the frame constructed in the manner described above provides an open-bottomed structure which can readily be placed over a vehicle and to which any suitable decorative material may be applied.

The top of the frame may be somewhat lower in that portion which overlies the forward end or hood of the vehicle and may be higher in the region of the roof of the vehicle, as best seen in Fig. 1, whereby an opening 39 is provided in the frame in front of the windshield of the vehicle, so that the driver will have ample, unobstructed view through the windshield.

The frame may be supported on the vehicle by transverse supports 40 and 42 positioned at each end of the vehicle and secured to the bumpers 41 thereof by means of J-bolts 44, as seen in Fig. 9, in which case the supports will lie beneath the bumpers, or the supports may be positioned on top of the bumpers and similarly secured thereto as indicated in Fig. 3. The supports, as seen in Fig. 3, are provided at their ends with hook-shaped members 46 projecting beyond the sides of the vehicle for receiving the bottom rails of the frame. When the supports are secured beneath the bumpers brackets 48 may be secured at their ends, which brackets are formed with a re-bent portion 50 serving to position the rail receiving portions of the brackets at substantially the same level as those of the hooks 46.

An additional support for the frame may be provided in the form of a transverse member 54 resting upon the roof of the vehicle, carrying a bar 56 of somewhat shorter length than the width of the frame. The member 54 may rest upon a cushioning material 58 positioned on the roof of the vehicle. The bar 56 has holes at its opposite ends through which threaded rods 60 and 62 extend downwardly and through holes in a transverse supporting member 64 beneath the bottom of the vehicle, said member extending beyond the sides of the vehicle. The rods 60 and 62 carry wing nuts 66 at their ends by which the parts may be adjusted to retain the supporting members 54 and 64 securely in engagement with the vehicle.

At each end of the supporting member 64 an angle 68 is secured, having an upwardly extending flange 70 to be secured to the bottom rail of the side frame section, by bolting or other suitable means.

When desirable, all of the parts of the foundation frame and its supports can be furnished to the user in one or more packages or bundles, with a sufficient number of bolts and fasteners to complete the same and instructions for use, and the various sections can be put together and assembled for decoration and mounting on the vehicle, as may be convenient or desired.

The side and end sections of the frame may be made up as units and secured together by bolts to form a complete frame structure ready for positioning on the vehicle. If more convenient, however, the side sections may be divided, in which case each part may be conveniently terminated by a vertical member 24, and the vertical members of two adjacent parts may be abutted in assembling the section. The parts are assembled in the manner indicated in Fig. 6, by the use of a strap piece 72 bolted to adjacent ends of the top rail 22. In this manner the frame can be made as long or as short as may be desired to accommodate vehicles of various sizes.

The gate 26 may be attached by hinges 74 or in other convenient manner, and may be provided with a latch 76 for retaining the same in closed position. The parts of the side frame section are of such length that the gate will be positioned in registration with the front door of the vehicle for facility in entering the same.

It will be apparent that the foundation frame as described above may be easily and quickly assembled and the decorative material applied thereto at any convenient time and place, after which the entire frame can be placed over the vehicle and secured thereto. If more convenient, the various sections of the frame can be decorated and assembled about the vehicle immediately prior to the time of use. A float so constructed leaves no projecting parts which might provide a hazard in moving the vehicle or afford means by which persons might be tempted to steal a ride on the float.

When the foundation frame has served its purpose, it can be readily disassembled by merely detaching the fasteners 38 at the corners and stacking the sections one upon another to form a compact bundle for storage or transportation. It will be seen that the invention provides a foundation frame of light and sturdy construction capable of repeated use, thus effecting a great saving in labor and material in the preparation of parade floats.

While the invention has been described in accordance with a particular embodiment of the same, it will be understood that many changes and modifications can be made in the various parts, as well as in the manner of assembling and supporting the same, without departing from the spirit of the invention or the scope of the appended claims.

What is claimed and desired to secure by Letters Patent is:

1. A foundation structure for a parade float adapted to be positioned over and carried by a vehicle which vehicle has a bumper on each end thereof, said structure comprising side and end frame sections, fastening means connecting said sections to form a substantially rectangular frame about said vehicle, transverse supports attachably secured to said bumper at the opposite ends of said vehicle and each having upwardly opening yoke members secured to the outer ends thereof and said yoke members being adapted to attachably engage said frame adjacent the ends thereof, and a transverse supporting member positioned mediate the ends of said vehicle adapted to engage said said frame between the ends thereof to support said frame from the top of the occupant compartment of said vehicle.

2. A foundation structure for a parade float comprising a frame adapted to be positioned over and supported in spaced relation to a vehicle, a supporting member positioned on and extending above said vehicle, means carried by said supporting member extending beyond the sides of said vehicle for engagement with said frame, and supporting members at ecah end of said vehicle extending beyond the sides of said vehicle and having upwardly opening hooks at each end thereof for engagement with the bottom of said frame and for the support thereof 3. A demountable frame structure adapted to be positioned over and carried by a vehicle, comprising side and end frame sections each of which sections has spaced upright bars and horizontal rails, fastening means for securing said upright bars and horizontal rails together to form the respective side and end frame sections, means for attachably securing adjacent corners of the side and end frame sections together to form a rectangular frame, transverse members positioned between upper sides of said side frame sections and attachably secured thereto, a transverse support bar attachably secured to each end of said vehicle and each bar having upwardly opening U-members secured to each end of said transverse support bar for supporting the side frame sections at the ends of said vehicle for quick detachment therefrom.

4. A demountable frame structure adapted to be positioned over and carried by a vehicle, comprising side and end frame sections, each of which has spaced upright bars and horizontal rails, fastening means for securing said upright bars and horizontal rails together to form the respective side and end frame sections, means for attachably securing adjacent corners of said side and end frame sections together to form a rectangular frame, transverse members positioned between the upper sides of said side frame sections and attachably secured thereto, at least three horizontally aligned transverse support members projecting beyond the sides of said vehicle and having an upwardly opening hook on each end thereof, which support members are attachably secured at each end of said vehicle for supporting said side frames for quick detachment from said transverse support members.

RICHARD W. KNIGHT.

REFERENCES CITED

The following references are of record in the file of this patent:

UNITED STATES PATENTS

| Number | Name | Date |
|---|---|---|
| 1,511,728 | Howland | Oct. 14, 1924 |
| 1,548,527 | Hillgren | Aug. 4, 1925 |
| 2,100,971 | McDonald | Nov. 30, 1937 |